United States Patent
Gonzales et al.

(10) Patent No.: US 8,582,739 B1
(45) Date of Patent: Nov. 12, 2013

(54) PROVIDING ACCESS TO COMMUNICATION PLANS VIA MULTIPLE ACCESS METHODS

(71) Applicant: Network Enhanced Telecom, LLP, Longview, TX (US)

(72) Inventors: Amanda Gonzales, Frisco, TX (US); Stephan Broquie, Magnolia, TX (US); Ryan Kendrick, Austin, TX (US); Bill Converse, Austin, TX (US); Steven Wood, Austin, TX (US); Philip Thornton, White Oak, TX (US); Andrew Ford, Austin, TX (US)

(73) Assignee: Network Enhanced Telecom, LLP, Longview, TX (US)

( * ) Notice: Subject to any disclaimer, the term of this patent is extended or adjusted under 35 U.S.C. 154(b) by 0 days.

(21) Appl. No.: 13/827,851

(22) Filed: Mar. 14, 2013

Related U.S. Application Data

(60) Provisional application No. 61/733,830, filed on Dec. 5, 2012, provisional application No. 61/727,037, filed on Nov. 15, 2012.

(51) Int. Cl.
*H04M 15/00* (2006.01)
(52) U.S. Cl.
USPC .................................. 379/114.2; 379/121.02
(58) Field of Classification Search
USPC ............. 379/114.15, 114.17, 114.2, 121.02, 379/121.03, 127.02; 455/406, 414.1
See application file for complete search history.

(56) References Cited

U.S. PATENT DOCUMENTS

| | | | |
|---|---|---|---|
| 7,280,645 B1 * | 10/2007 | Allen et al. | 379/114.2 |
| 2005/0170854 A1 * | 8/2005 | Benco et al. | 455/461 |
| 2006/0078099 A1 * | 4/2006 | Liebenow et al. | 379/114.2 |
| 2007/0037550 A1 * | 2/2007 | Rassam | 455/406 |
| 2007/0286367 A1 * | 12/2007 | McCann et al. | 379/114.2 |
| 2012/0014517 A1 * | 1/2012 | Orr et al. | 379/142.05 |
| 2012/0170729 A1 * | 7/2012 | Alexander et al. | 379/114.03 |

* cited by examiner

*Primary Examiner* — Quoc D Tran
(74) *Attorney, Agent, or Firm* — Fish & Richardson P.C.

(57) ABSTRACT

One computer-implemented method includes identifying a plurality of communication plans, identifying a first communication associated with a first access method and associated with a first attribute, determining a first communication plan associated with the first communication from the plurality of communication plans, the determination based at least in part on the first attribute associated with the first communication, identifying a second communication different than the first communication and associated with the first access method, the second communication associated with a second attribute different than the first attribute, and determining a second communication plan associated with the second communication from the plurality of communication plans, the determination based at least in part on the second attribute associated with the second communication, wherein the first and second communication plans are associated with a prepaid pay-as-you-go or subscription monetary values.

20 Claims, 5 Drawing Sheets

US 8,582,739 B1

PROVIDING ACCESS TO COMMUNICATION PLANS VIA MULTIPLE ACCESS METHODS

CROSS REFERENCE TO RELATED APPLICATIONS

This application claims the benefit of U.S. Provisional Application No. 61/727,037, filed Nov. 15, 2012, and U.S. Provisional Application 61/733,830, filed Dec. 5, 2012, both of which are hereby incorporated by reference.

TECHNICAL FIELD

The present disclosure relates to computer-implemented methods, software, and systems for providing access to multiple communication plans for communications using multiple, different access methods.

BACKGROUND

Network services allow subscribers to place communications (calls, messages, etc.) to destinations around the world.

SUMMARY

The present disclosure involves systems, software, and computer implemented methods for providing access to multiple communication plans for communications using multiple, different access methods. One computer-implemented method includes identifying a plurality of communication plans, identifying a first communication associated with a first access method and associated with a first attribute, determining a first communication plan associated with the first communication from the plurality of communication plans, the determination based at least in part on the first attribute associated with the first communication, identifying a second communication different than the first communication and associated with the first access method, the second communication associated with a second attribute different than the first attribute, and determining a second communication plan associated with the second communication from the plurality of communication plans, the determination based at least in part on the second attribute associated with the second communication, wherein the first communication plan is associated with a first prepaid subscription or pay-as-you-go monetary value, and the second communication plan is associated with a second prepaid subscription or pay-as-you-go monetary value.

Another computer-implemented method includes identifying a first communication including an associated destination address, identifying a communication plan associated with the first communication, determining that the first communication is a completed communication to the destination address, associating the destination address with the communication plan upon determination that the first communication is a completed communication, and permitting subsequent communications to the destination address under the communication plan, wherein the communication plan is associated with a prepaid subscription or pay-as-you-go monetary value.

Like reference numbers and designations in the various drawings indicate like elements.

DETAILED DESCRIPTION

Figure 1:
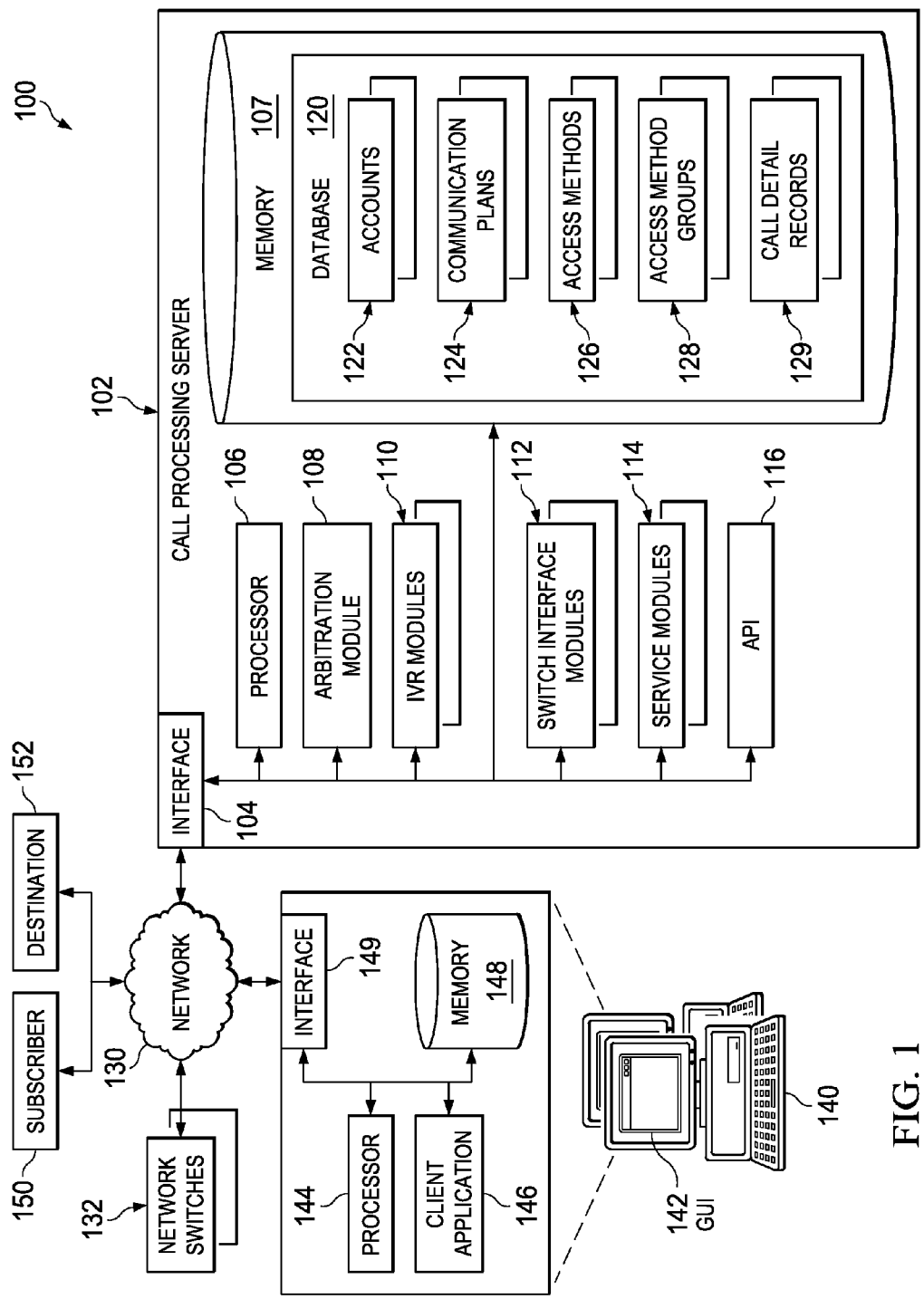
FIG. 1 is a block diagram illustrating an example system for providing access to a communication plan for communications using multiple different access methods.

The present disclosure relates to computer-implemented methods, software, and systems for providing access to multiple communication plans for communications using multiple, different access methods.

The present disclosure describes a solution for providing different communication plans to communications using multiple access methods. A communication may be any type of one-way or multi-way communication session between two or more individuals, systems, or entities, including, but not limited to, telephone calls, text messages, video and audio conferences, chat rooms, interactions over the Internet, or any other suitable communications sessions. Although some examples in the present disclosure are presented in the context of subscriber to subscriber telephone calls, the present disclosure contemplates these examples being applied to any suitable communication type.

Generally, these communications are placed by subscribers associated with accounts of a particular provider. For a given communication, a communication plan may govern the rating and billing of the communication. The communication plan may specify a rate that the subscriber's account will be charged for each minute of talk time in a completed communication to a destination, one-time surcharges to be charged to the subscriber's account, and various other details related to charging the subscriber for the communication.

In some implementations, the communications plans may be determined according to attributes associated with the communication, for example, an access method group, an inbound carrier, a dialed destination number, or any other suitable attribute. The attributes may also be of the same type, and the values may differ. In other implementations, a communication may be identified as associated with a preferred communication plan, and the subscriber may be prompted to change the communication plan in response to an indication that the communication cannot be serviced under the preferred communication plan. In other implementations, the subscriber's behavior may alter the configuration of the identified communication plan. For example, in some implementations, a dialed destination number may be registered with the communication plan when the subscriber first attempts to connect to the destination and the communication plan may provide unlimited calling to the destination number for a certain amount of time.

The present solution has the advantage of allowing account issuers more flexibility in configuring the communication plans associated with communications made on their accounts. Communications made using the same access method may be processed using different communication plans, and communications made on different access methods may be processed using the same communication plan. This decoupling of communication plans from access methods may also lead to cost savings for the account issuer and service provider, as fewer access methods (such as 800 numbers and public IP addresses) will be necessary. Further, such an approach may lead to greater end user satisfaction due to increased convenience.

FIG. 1 is a block diagram illustrating an example system 100 for providing access to a communication plan for calls using multiple, different access methods. The system 100 includes a call processing server 102 that interacts with a network 130 to control one or more network switches 132 to connect calls from subscribers 150 to destinations 152. In some implementations, the network 130 is the Internet. In other implementations, the network 130 includes multiple discrete networks, for example the Internet, the public switched telephone network (PSTN), a local area network, or other suitable networks. In such implementations, control data from the call processing server 102 to the one or more network switches 132 may be sent over a local area network and the call path between the subscriber 150 and the destination 152 is over the PSTN. In other implementations, the call path between the subscriber 150 and the destination 152 is established over the Internet, such as in a voice over IP (VoIP) scenario. The graphical user interface (GUI) 142 of client 140 may be used by administrators to configure various aspects of the call processing server 102, such as communication plans 124 stored in memory 107. The communication plans 124 may include instructions for rating and billing a call between a subscriber and a destination, such as, for example, a call between subscriber 150 and destination 152.

In the depicted implementation, the call processing server 102 is a data processing apparatus that may include various components for providing communications service, including an interface 104, a processor 106, an arbitration module 108, one or more interactive voice response (IVR) modules 110, one or more switch interface modules 112, one or more service modules 114, and an application programming interface (API) module 116.

The interface 104 may be used by the call processing server 102 for communicating with other systems in a distributed environment—including within the system 100—connected to the network 130; for example, the client 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated system 100.

The call processing server 102 may include a processor 106. In some cases, the processor 106 directs the operation of the other components of the call processing server 102 by executing the software instructions making up these various components. In some cases, the processor 106 may include multiple physical central processing units (CPUs) which may be contained inside a single chassis or distributed across multiple computers and connected via a network or backplane. In some cases, the processor 106 may be a general purpose processor such as those produced by INTEL, AMD, HP, ARM, APPLE, or any other suitable processor. The processor 106 may also be a custom application specific integrated circuit (ASIC) or field programmable gate array (FPGA) specifically adapted to the present application.

The call processing server 102 may also include an arbitration module 108. In some instances, the arbitration module 108 may be a software application operable to determine which of the service modules 114 should be executed for a particular call, such as a call from subscriber 150. The arbitration module 108 may receive a "NEW CALL" event from one of the network switches 132 including information about a newly received call on the network switch. The arbitration module 108 may be operable to decide whether to accept or reject a particular call in addition to determining the service module 114 to handle the call. Such a configuration may reduce the load on other components in call processing server 102 by quickly disposing of invalid calls before additional processing time is spent on the calls. In some cases, the arbitration module 108 executes on a separate server or servers from the remaining components of call processing server 102, and transfers control of a particular call to a second server after determining that the call should proceed. In some cases, this transfer may necessitate sending a control message to the network switch associated with the call to inform the switch of to which server additional events should be sent.

In the illustrated implementation, the call processing server 102 includes one or more IVR modules 110. In some cases, the IVR modules 110 may be a combination of control software and digital signal processing (DSP) hardware for performing various signal processing tasks on the voice path of a call. These tasks may include detecting digits, inserting recorded voice prompts, converting text to speech and inserting the resulting speech into the voice path, detecting speech and converting it to text, as well as other tasks relating to detecting or producing digital signals related to the voice path of a call. In some cases, the IVR modules 110 are integrated into dedicated servers and controlled via a local area network by the other components of call processing server 102. The IVR modules 110 may also be integrated into the same server as the other components of call processing server 102 and controlled via a local application programming interface (API).

The call processing server 102 may also include one or more switch interface modules 112. In some cases, the switch interface modules 112 may be one or more software libraries including instructions operable to build, parse, send and receive messages to and from the one or more network switches 132. These messages may allow the call processing server 102 to both monitor and control the behavior of the one or more network switches 132. In some cases, the switch interface modules 112 may include methods called by the other components of the call processing server 102 to monitor and control the one or more network switches 132. The switch interface modules 112 may also be independent software applications executing on a server and interacting with the one or more network switches 132. In such cases, the other components of the call processing server 102 may access the functionality of the switch interface modules 112 through a network API. In some cases, the switch interface modules 112 may be operable to produce reports related to the one or more network switches 132 including reports showing the number of active calls on a switch, the status of calls of the switch, a log of errors associated with the switch, and other suitable reports.

One or more service modules 114 may also be included in call processing server 102. In some cases, the service modules 114 may include instructions related to the specific user experience a subscriber (such as subscriber 150) will experience when accessing the system. In some cases, the service module to execute is determined according to the access method used by subscriber 150 to access the system. The service modules 114 may include instructions relating to the playing of voice prompts, the collecting of account information, the playing of interactive menus, the providing of various account information (such as balances and statuses), functionality to allow a subscriber to add money to an account such as by charging a credit card, the playing of mid-call voice prompts such as warnings when the balance of an account is low, and other functionality. In some cases, the service modules 114 may be included in a single software application. The service modules 114 may also each be separate software applications. In some instances, the service modules 114 may utilize the switch interface modules 112 in order to interact with the one or more network switches 132, such as, for example, to connect a subscriber to a specified destination number. The service modules 114 may also be software libraries loaded and executed by a framework call processing application on demand rather than stand-alone software applications.

The call processing server 102 may also include an API 116 allowing external applications (such as the GUI 142) to access the various components included in the call processing server 102. In some cases, the API 116 may be a proprietary API written specifically for the call processing server 102. The API 116 may also be an industry standard telephony API such as SIP, H.323, AIN, or any other suitable API. The API 116 may also be an industry standard API for exposing functionality over a network such as CORBA, RPC, or any other suitable API. In some instances, the API 116 may be implemented via Hypertext Transfer Protocol (HTTP) and the various functionality of the call processing server 102 may be accessed by specifically formed Uniform Resource Locators (URLs). The API 116 may also provide access to the functionality of the call processing server 102 via other mediums such as SMS text message, email, or other mediums.

The call processing server 102 may also include a memory 107 for storing a database 120. The database 120 may store various data items including accounts 122, communication plans 124, access methods 126, access method groups 128, and call detail records 129. The database 120 may also contain service configurations, voice prompts, rating information, destination geographic information, call detail records, and any other necessary configuration or historical data necessary to perform the described service. The database 120 may include several different databases hosted on different servers connected via local area network or a public network such as the Internet. In such a configuration, the component databases of database 120 may be interconnected by a replication mechanism that keeps the component databases in sync. In some implementations, the component databases may be exact replicas of each other, while in other implementations only a portion of the databases may be replicated. The database 120 may be provided and managed by a database management system (DBMS) including, but not limited to, ORACLE, INFORMIX, DB2, SQL SERVER, MYSQL, POSTGRES, SQLITE, VERTICA, or any other suitable DBMS. In some cases, the various data items stored by database may be stored in separate relational tables, while in other cases the data items may be stored in individual rows inside a table, in columns inside a table, across various tables, more than one data item in a single table, or in any other suitable configuration. The database 120 may also store additional configuration related to the other components of the call processing server 102, which may access the database 120 to retrieve this information and the data items specifically described herein.

The database 120 may include one or more accounts 122. In some cases, the accounts 122 may each be associated with a personal identification number (PIN) which a subscriber may enter to access the account during a call. The accounts 122 may also each be associated with a balance representing a prepaid amount of money that may be applied towards the cost of communications services associated with the account. When a subscriber makes a call associated with the account, the balance may be debited for the cost of the associated call. In some cases, the accounts 122 are arranged in account groups where all accounts in a group include similar attributes. For example, an account group may include 1000 accounts associated with a certain customer each with a unique PIN and each with a balance of five dollars. In some cases, the accounts 122 may not include a balance, and any communications services associated with the account may be tracked and billed to the subscriber rather than being debited from the account. In some instances, each of the accounts 122 may be represented by a single row in an associated database table or by multiple rows in multiple database tables.

The database 120 may also include one or more communication plans 124. In some cases, the communication plans 124 include configuration related to rating and billing particular accesses to the system 100 such as calls made between subscriber 150 and destination 152. In other cases, the communication plans 124 may apply to other types of services that do not include a one-to-one relationship between a subscriber and a destination such as a conference call. The communication plans 124 may also apply to services that do not include a destination number at all such as a service to allow subscriber 150 to recharge an account.

In some cases, the communication plans 124 specify a rate to be charged to a call per a unit of time. For example, a communication plan may be configured to charge a call five cents for each minute. In other cases, the communication plan may include other charges in addition to or instead of this rate, such as, for example, a one-time access charge, a connection fee, an activation fee, an end-of-call surcharge, a one-time delayed surcharge (e.g., a five cent charge after ten minutes of talk time), or other suitable charges. The communication plans 124 may also include charges applied to different entities other than the subscriber 150. For example, the communication plan may include charges incurred by a distributor, charges applied by an outbound carrier, or other charges.

The communication plans 124 may be associated with different components included in database 120, which may be used to determine the particular communication plan to be used for a particular call. In some cases, the communication plans 124 may be associated with accounts 122, access method groups 128, geographic regions, times of day, and other components stored in and/or external to database 120.

The database 120 may also include access methods 126. In some cases, access methods 126 may include any mechanism by which the call processing server 102 may be accessed by subscriber 150, including, but not limited to, phone numbers that the subscriber may dial, IP addresses that the subscriber may connect to, phone numbers that the subscriber may send an SMS text message to, SS7 point codes, URLs that the subscriber may connect to, re-origination, and other mechanisms. In some cases, the access methods 126 may be associated with one or more access method groups 128. The access method groups 128 may be used to group access methods that share common configuration attributes and thus may be treated the same. In some cases, a single access method may belong to multiple access method groups 128, while in other cases, an access method may be associated with only one access method group.

The database 120 may also include one or more call detail records 129 providing information about calls that have been processed by call processing server 102. In some cases, a single call detail record is inserted into database 120 for each call serviced by the call processing server 102. The database 120 may also contain multiple call detail records for each call. In some instances, the one or more call detail records 129 contain various information about the call including, but not limited to, the time the call occurred, the duration of the call, any charges incurred by the call, the account used to make the call, the destination number or numbers connected to during the call, the communication plan used by the call, and any other appropriate information. In some cases, the call detail records 129 are used to produce reports showing call activity, profitability, and other metrics.

The system 100 may also include one or more network switches 132 communicatively coupled to network 130. In some cases, the network switches 132 may be standard telecom equipment used to connect time slots or ports together to complete telephone calls. The network switches 132 may also be voice over internet protocol (VoIP) equipment operable to service telephone calls originating and/or terminating to IP networks. The network switches 132 may be commercially available networking equipment including products manufactured by ALCATEL-LUCENT, CISCO, NORTEL, HP, STRATUS or any other suitable switching product. The network switches 132 may also include general purpose routers, multiplexers, gateways, or other equipment. In some cases, the network switches 132 may be controlled by the call processing server 102 via one or more APIs. The APIs may be standard protocols such as SIP or H.323, proprietary control protocols specific to the manufacturer of the network switch, or any other suitable API or combination of APIs.

The system 100 may also include a subscriber 150. In some cases, the subscriber 150 may be a person associated with one of the accounts 122. The subscriber 150 may access the call processing server 102 by an access number on an associated telephone. The subscriber 150 may also access the call processing server 102 by connecting to an IP address associated with the call processing server 102 or one of the network switches 132. In some instances, the subscriber 150 may access the call processing server 102 or network switches 132 using a software application configured to communicate with these components. The call processing server 102 may execute one of the service modules 114 to provide a service to the subscriber 150. In some cases, the call processing server 102 may interact with the one or more network switches 132 to connect subscriber 150 to a destination 152. In some cases, destination 152 may be another subscriber of the call processing server 102. The destination 152 may also be any telephone or other communications device, and may be identified by a destination telephone number entered by the subscriber 150.

The system 100 may also include a client 140 that includes a GUI 142. The client may include an interface 149, a processor 144, a memory 148 and a client application 146. The client 140 may be used by administrator or a subscriber to access the call processing server 102 in order to view or change the various data items stored in database 120, view or change reports generated from the data items in the database 120, make calls or perform any other suitable function.

Figure 2:
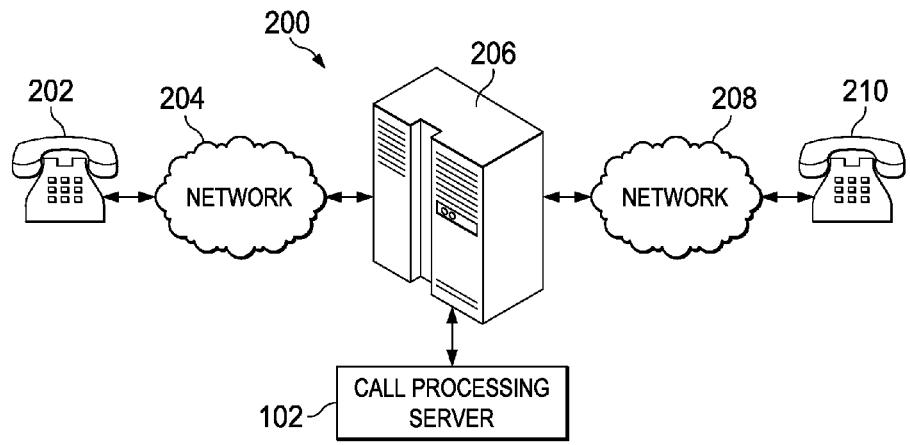
FIG. 2 is a block diagram illustrating an example system for completing a communication between a subscriber and a destination according to the present disclosure.

FIG. 2 is a block diagram illustrating an example system 200 for completing telephone calls between a subscriber and a destination according to the present disclosure. As discussed previously, the present disclosure contemplates the application of the examples in this figure to any suitable type of communication. In the illustrated implementation, the subscriber telephone 202 is connected to the switch 206 by a network 204. In some cases, the network 204 may be the Internet. The network may also be the PSTN, a local area network, or any other suitable network or combination of networks. The switch 206 may be connected to the call processing server 102. In some cases, the switch 206 is similar or identical to the network switches 132 described relative to FIG. 1. The call processing server 102 may receive an indication from the switch 206 of events associated with various calls. For example, the call processing server 102 may receive an event when the switch 206 detects a new call, such as from subscriber telephone 202. The call processing server 102 may also instruct the switch 206 to perform various switching actions, such as connecting an inbound circuit associated with the subscriber telephone 202 to an outbound circuit associated with the destination telephone 210. In a non-circuit based implementation, such as a VOIP based solution, the call processing server 102 may instruct the switch connect an IP address and port combination associated with the subscriber telephone 202 to an IP address and port combination associated with the destination telephone 210. In some cases, the call processing server 102 may communicate with the switch 206 over a local area network, while in other cases the communication may occur over the Internet. The communication may also be through dedicated telephony network via signaling protocols such as Signaling System 7 (SS7) or Integrated Services Digital Network (ISDN). As shown in FIG. 2, the destination telephone 210 may be connected to the switch 206 by a network 208. In some cases, the network 208 may be the Internet, while in other cases this network may be a part of the PSTN. The network 208 may also be the same as network 204.

Figure 3:
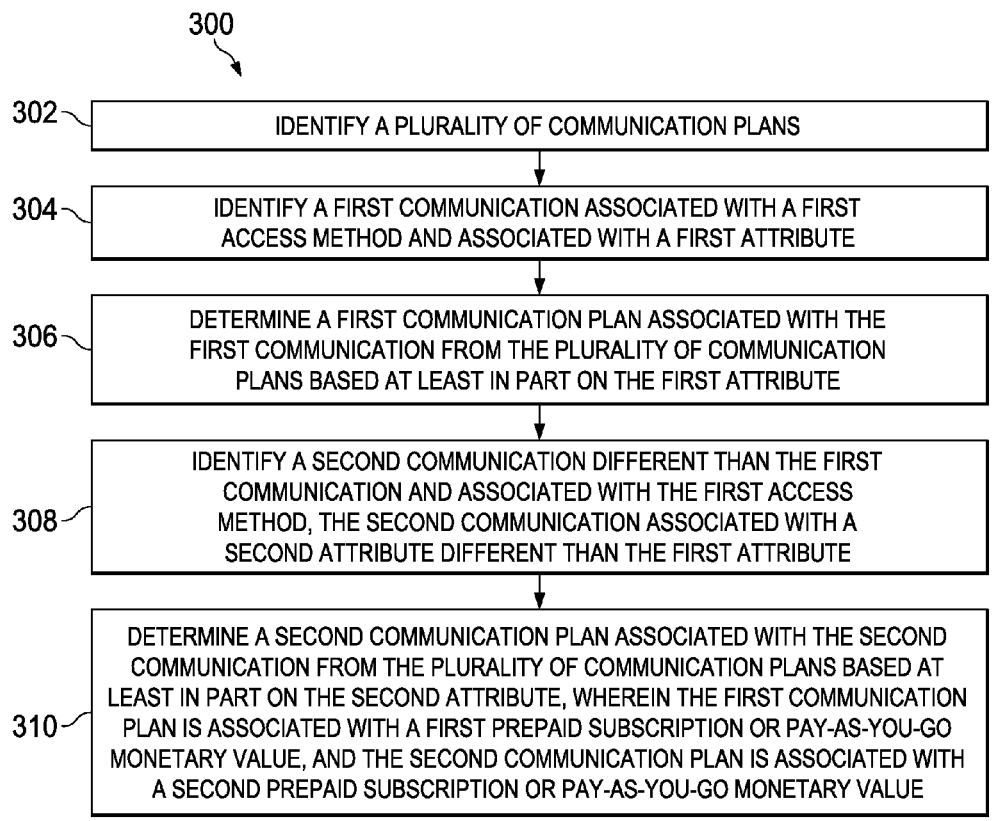
FIG. 3 is a flowchart of an example method for providing access to different communication plans for communications using the same access method.

FIG. 3 is a flowchart of an example method 300 for providing access to a communication plan for communications using multiple, different access methods. At 302, a plurality of communication plans are identified. In some instances, the plurality of communication plans may be stored in a table or collection of tables in a database. The plurality of communication plans may be associated with a context attribute or some other identifier for identifying the plurality of communication plans from the entirety of the communication plans associated with the method.

At 304, a first communication associated with a first access method and associated with a first attribute is identified. In some cases, the first communication is identified by the reception of a "new call" or other event from a network switch. The first communication may also be identified by the receipt of an API message or other request for service. The first communication may be associated with a first attribute. In some cases the attribute is associated with the first communication by performing look ups related to the first communication in database. The first attribute may also be contained in the event identifying the first communication and require no external lookup. The first attribute may include, but is not limited to, a carrier id, an access method group, a destination number, a destination geographic area (e.g., a country, city or region), a time of day, a call sequence number, an account, an account group, or any other suitable attribute or combination of attributes.

At 306, a first communication plan associated with the first communication is determined, the determination based at least in part on the first attribute associated with the first communication. In some instances, the determination may be made by looking up the associated communication plan in a database or other data store. For example, the method 300 may determine the communication plan for the first communication by looking up the entered destination number in a database and finding an associated communication plan. In some cases, the communication plan is determined by performing several of these lookups, with certain attributes or portions of attributes being given precedence over others in the lookup. The method 300 may also be operable to change the lookup behavior based on additional configuration parameters which may add or remove different portions of the first attribute from consideration in determining the first communication plan. For example, a configuration associated with a certain communication may remove time of day from the consideration in determining the communication plan.

At 308, a second communication different than the first communication and associated with the first access method is identified, the second communication associated with a second attribute different than the first attribute. As discussed above relative to the first attribute, the second attribute may include, but is not limited to, a carrier id, an access method group, a destination number, a destination geographic area (e.g., a country, city or region), a time of day, a call sequence number, an account, an account group, or any other suitable attribute or combination of attributes.

At 310, a second communication plan associated with the second communication is determined, the determination based at least in part on the second attribute associated with the second communication. In some instances, the determination may be made by looking up the associated communication plan in a database or other data store. For example, the method 300 may determine the communication plan for the second communication by looking up the entered destination number in a database and finding an associated communication plan. In some cases, the communication plan is determined by performing several of these lookups, with certain attributes or portions of attributes being given precedence over others in the lookup. The method 300 may also be operable to change the lookup behavior based on additional configuration parameters which may add or remove different portions of the second attribute from consideration in determining the second communication plan. For example, a configuration associated with a certain communication may remove time of day from the consideration in determining the communication plan.

In some cases, the first and second communication plans may be associated with prepaid pay-as-you-go or subscription monetary values. For example, a prepaid subscription monetary value may be an amount a subscriber pays up front for a certain duration of service, and a pay-as-you-go prepaid monetary value may be a balance that is decremented for each call, minute, unit or event on the communication plan, and recharged when it reaches zero. In some implementations, the first and second communication plans may be associated with the same prepaid pay-as-you-go or subscription monetary value. The first and second communication plans may also be associated with different prepaid pay-as-you-go or subscription monetary values.

Figure 4:
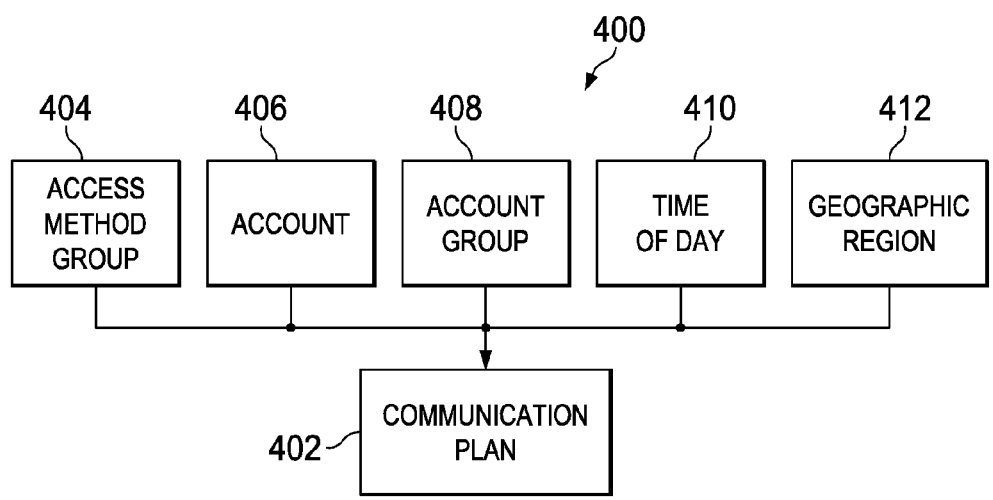
FIG. 4 illustrates an example data format for providing access to a communication plan for communications using multiple, different access methods.

FIG. 4 illustrates an example data association 400 for providing access to one or more communication plans 402 for communications using multiple, different access methods. As shown, the one or more communication plans may be associated with an access method group 404, an account 406, an account group 408, a time of day 410, and a geographic region 412. These attributes are provided for exemplary purposes only, and additional attributes may be used in determining the communication plan for use with a certain communication. The various data attributes and the communication plans 402 may be stored in a database. During a communication, the system may query this database to determine the communication plan associated with the particular communication. In some cases, a plurality of communication plans may be associated with a single communication, and the subscriber associated with the communication may be given the option of choosing which communication plan to use.

Figure 5:
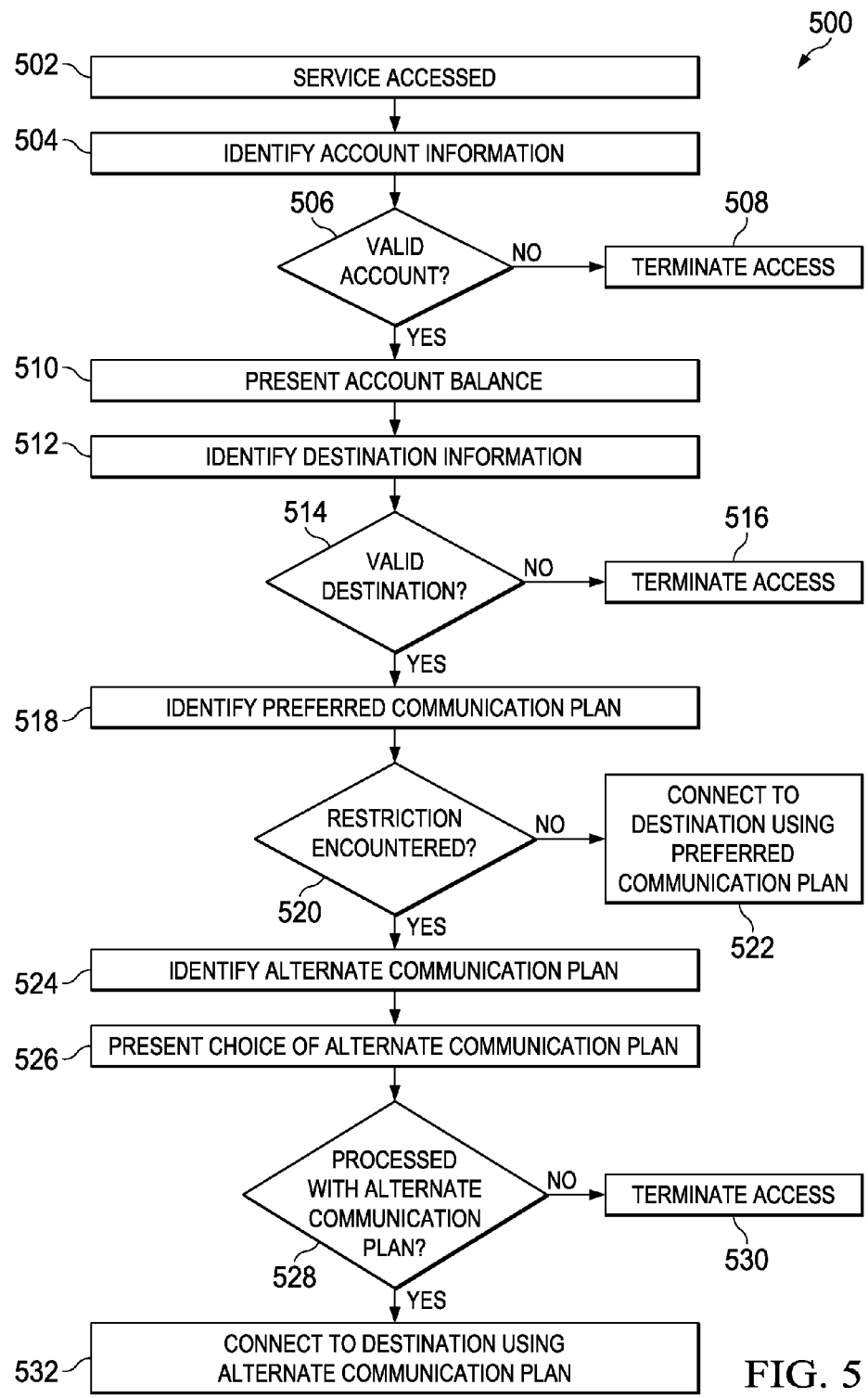
FIG. 5 illustrates an example method for allowing a subscriber to choose whether to proceed with a communication when a preferred communication plan is unavailable.

FIG. 5 illustrates an example method 500 for allowing a subscriber to choose whether to proceed with a call when a preferred communication plan is unavailable. At 502, the service is accessed by the subscriber using an access method. As discussed previously, this access may involve the subscriber dialing a telephone number or connecting to an IP address associated with the service. At 504, account information is identified. This may involve examining attributes identified when the service is accessed (such as originating address or telephone number (ANI)), prompting the subscriber to enter account information (such as a PIN), or any other suitable procedure. At 506, a determination is made whether the identified account is valid. This determination may involve querying a database to determine if the account information is present. If the account information is present, the determination may further involve checking a status of the account. If the account is determined to not be valid, the method 500 proceeds to 508, where the access is terminated. This termination may involve disconnecting the call, severing a connection, sending a message to a network element instructing it to terminate the access, or any other suitable action.

If the account is determined to be valid at 506, the method 500 continues to 510 where the account balance may be presented to the subscriber associated with the access. The balance may be presented by playing a series of recorded prompts indicating the balance (e.g., "you have nine dollars, sixty-five cents"). At 512, destination information associated with the call is identified. In some cases, the destination information may be identified by collecting a destination number from the subscriber associated with the access. The destination information may also be identified by examining attributes identified when the service was first accessed. At 514, a determination is made as to whether the destination number is valid. This determination may be made by parsing the destination number to determine if it is the correct length or format, looking the destination number up in a database table containing known country codes, area codes, city codes, region codes, and/or other information defining valid destination numbers. In some cases, a destination may be determined to be invalid if no communication plan can be identified for the destination number, and if no communication plan can be identified for other attributes related to the access. If the destination is determined to not be valid, the access is terminated at 516. If the destination is determined to be valid, the method 500 continues to 518.

At 518, a preferred communication plan is identified for the access. The preferred communication plan may be identified by performing a database lookup using attributes associated with the access. In some cases, the preferred communication plan may be configured according to preference specified by the subscriber associated with the identified account. The preferred communication plan may also be configured according to a preference of the account issuer or an administrator of the system.

At 520, a determination is made whether a restriction associated with the preferred communication plan has been encountered. A restriction may be any configured limitation operable to invalidate the use of the preferred communication plan for the current access. For example, the preferred communication plan may include a restriction stating that only a certain number of calls can be made using the preferred communication plan in a certain period of time. Calls made after this number is reached and before the end of the time period would encounter the restriction. In another example, the preferred communication plan may include a restriction that is only to be used from 2 pm to 4 pm on Friday. Calls made outside this time period would encounter the restriction. In some cases, the restrictions may be any conditional expression that will prevent the use of the preferred communication plan when evaluated to be true, and may involve any of the attributes associated with a system access or call discussed in the present disclosure. If it is determined that no restriction has been encountered, the method 500 continues to 522, and a connection is made to the destination using the preferred communication plan. If a restriction is encountered, the method 500 continues to 524.

At 524, an alternate communication plan is identified. The alternate communication plan may be identified according to the same methods as the preferred communication plan, and may be a communication plan with a lower sequence or priority than the preferred communication plan. At 526, the subscriber associated with the access is given the choice of continuing with the alternate communication plan or terminating access. This choice may be presented by playing a voice prompt to the subscriber and collecting one or more digits or a spoken word indicating the subscriber's response. At 528, the subscriber's choice is evaluated. If the subscriber chooses not to continue with the alternate communication plan, the method 500 continues to 530 where the access is terminated. If the subscriber chooses to continue with the alternate communication plan, the method 500 continues to 532 where the destination is connected to using the alternate communication plan.

Figure 6:
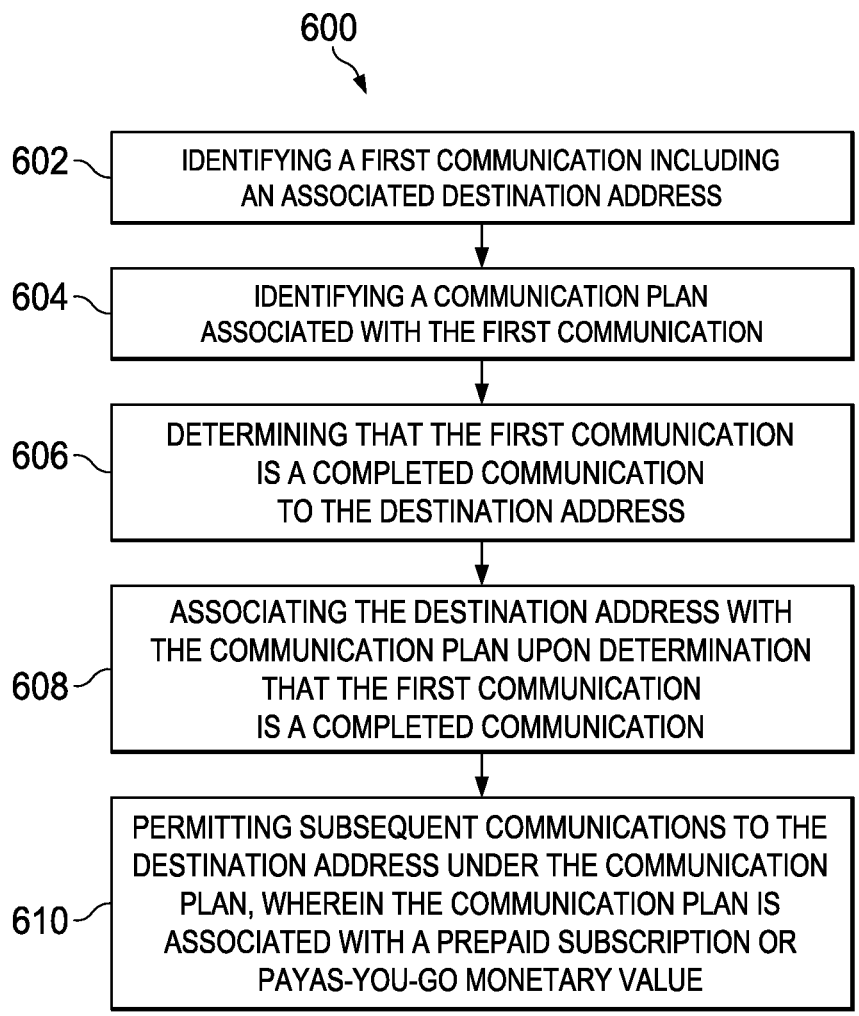
FIG. 6 illustrates an example method for reconfiguring a communication plan in response to subscriber behavior.

FIG. 6 illustrates an example method 600 for reconfiguring a communication plan in response to subscriber behavior. At 602, a first communication is identified including an associated destination address. At 604, a communication plan is identified associated with the first communication. At 606, a determination is made whether the first communication is a completed communication to the destination address. In some cases, a complete communication may be a communication that involves a successful connection to another party such as, for example, a completed phone call.

At 608, the destination address is associated with the communication plan upon determination that the communication is a completed communication. In some cases, associating the destination with the communication plan includes inserting an entry into an associated database table for the destination.

At 610, subsequent calls are permitted to the destination address under the communication plan. For example, at a later time, another call may have the same communication plan and destination address identified. In this case, the communication plan will be applied to the call, and the determination whether the number of destination addresses associated with the communication is valid will be skipped. In some cases, the destination addresses may only be associated with the communication plan for a certain period of time, at which point they will be deactivated or deleted from the database. In such a case, the subsequent call would not be permitted to use the communication plan at 610 and would instead be processed through the remainder of method 600.

In some cases, the communication plan is associated with a prepaid pay-as-you-go or subscription monetary value. For example, a prepaid subscription monetary value may be an amount a subscriber pays up front for a certain duration of service, and a pay-as-you-go prepaid monetary value may be a balance that is decremented for each call, minute, unit or event on the communication plan, and recharged when it reaches zero.

In some implementations, the method 600 may include identifying a reset condition associated with the communication plan. Upon the occurrence of the reset condition, the destination address may be disassociated from the communication plan. In some cases, the reset condition may be configured to occur at a particular time. The reset condition may also be configured to occur after a certain number of communications are permitted to the destination address under the communication plan. The reset condition may also be configured to occur after a certain number of communications are permitted to all destination addresses configured under the communication plan.

In some cases, the maximum number of destinations is stored in a database table associated with the communication plan or is an attribute of the communication plan itself. The maximum number of destinations may also be configurable by other account, account group, geographic region of the destination, or any other attribute discussed previously. The maximum number of destinations may also be a global setting application to all calls in a given system.

In some implementations, multiple unlimited communication plans may be associated with a given communication. For example, there may be a first unlimited plan associated with a first set of destinations and a second unlimited plan associated with a second set of destinations. In some implementations, an unlimited plan may be configured to offer the subscriber an option to pre-pay for another period of service during the call, such as with a credit card. In some instances, an unlimited plan may be configured to allow a subscriber to submit for a refund from previous charges.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
identifying a first communication including an associated destination address;
identifying a communication plan associated with the first communication;
determining that the first communication is a completed communication to the destination address;
determining, by the one or more processors, whether to associate the destination address with the communication plan;
associating the destination address with the communication plan upon determination that the first communication is a completed communication; and
permitting subsequent communications to the destination address under the communication plan,
wherein the communication plan is associated with a prepaid subscription or pay-as-you-go monetary value.

2. The method of claim 1, further comprising:
determining a number of destination addresses associated with the communication plan;
determining whether the number of destination addresses associated with the communication plan is less than a maximum number of destination addresses that can be associated with the communication plan,
wherein associating the destination address with the communication plan occurs in response to determining that the number of destination addresses associated with the communication plan is less than the maximum number of destination addresses.

3. The method of claim 1, further comprising:
presenting the first communication with an option to use an alternate communication plan upon determination that the number of destination addresses associated with the communication plan is greater than or equal to the maximum number of destination addresses that can be associated with the communication plan.

4. The method of claim 1, wherein the communication plan is an unlimited communication plan.

5. The method of claim 1, further comprising:
identifying a reset condition associated with the communication plan; and
disassociating the destination address from the communication plan upon the occurrence of the reset condition.

6. The method of claim 5, wherein the reset condition is configured to occur at a particular time.

7. The method of claim 5, wherein the reset condition is configured to occur after a certain number of communications are permitted to the destination address under the communication plan.

8. The method of claim 5, wherein the reset condition is configured to occur after a certain number of communications are permitted to all destination addresses associated with the communication plan.

9. A non-transitory, computer-readable medium storing instructions operable when executed to cause at least one processor to perform operations comprising:
identifying a first communication including an associated destination address;
identifying a communication plan associated with the first communication;
determining that the first communication is a completed communication to the destination address;
determining, by the one or more processors, whether to associate the destination address with the communication plan;

associating the destination address with the communication plan upon determination that the first communication is a completed communication; and permitting subsequent communications to the destination address under the communication plan, wherein the communication plan is associated with a prepaid subscription or pay-as-you-go monetary value.

10. The computer-readable medium of claim 9, further comprising:

determining a number of destination addresses associated with the communication plan;

determining whether the number of destination addresses associated with the communication plan is less than a maximum number of destination addresses that can be associated with the communication plan, wherein associating the destination address with the communication plan occurs in response to determining that the number of destination addresses associated with the communication plan is less than the maximum number of destination addresses.

11. The computer-readable medium of claim 9, further comprising:

presenting the first communication with an option to use an alternate communication plan upon determination that the number of destination addresses associated with the communication plan is greater than or equal to the maximum number of destination addresses that can be associated with the communication plan.

12. The computer-readable medium of claim 9, wherein the communication plan is an unlimited communication plan.

13. The computer-readable medium of claim 9, further comprising:

identifying a reset condition associated with the communication plan; and disassociating the destination address from the communication plan upon the occurrence of the reset condition.

14. The computer-readable medium of claim 13, wherein the reset condition is configured to occur at a particular time.

15. The computer-readable medium of claim 13, wherein the reset condition is configured to occur after a certain number of communications are permitted to the destination address under the communication plan.

16. The computer-readable medium of claim 13, wherein the reset condition is configured to occur after a certain number of communications are permitted to all destination addresses associated with the communication plan.

17. A system comprising:

memory for storing data; and one or more processors operable to perform operations comprising:

identifying a first communication including an associated destination address;

identifying a communication plan associated with the first communication;

determining that the first communication is a completed communication to the destination address;

determining, by the one or more processors, whether to associate the destination address with the communication plan;

associating the destination address with the communication plan upon determination that the first communication is a completed communication; and permitting subsequent communications to the destination address under the communication plan, wherein the communication plan is associated with a prepaid subscription or pay-as-you-go monetary value.

18. The system of claim 17, the operations further comprising:

determining a number of destination addresses associated with the communication plan;

determining whether the number of destination addresses associated with the communication plan is less than a maximum number of destination addresses that can be associated with the communication plan, wherein associating the destination address with the communication plan occurs in response to determining that the number of destination addresses associated with the communication plan is less than the maximum number of destination addresses.

19. The system of claim 17, the operations further comprising:

presenting the first communication with an option to use an alternate communication plan upon determination that the number of destination addresses associated with the communication plan is greater than or equal to the maximum number of destination addresses that can be associated with the communication plan.

20. The system of claim 17, wherein the communication plan is an unlimited communication plan.

\* \* \* \* \*